Jan. 26, 1965
L. G. SHARP
3,167,121
METHOD FOR PRODUCING HIGH VISCOSITY OIL
Filed Dec. 13, 1962
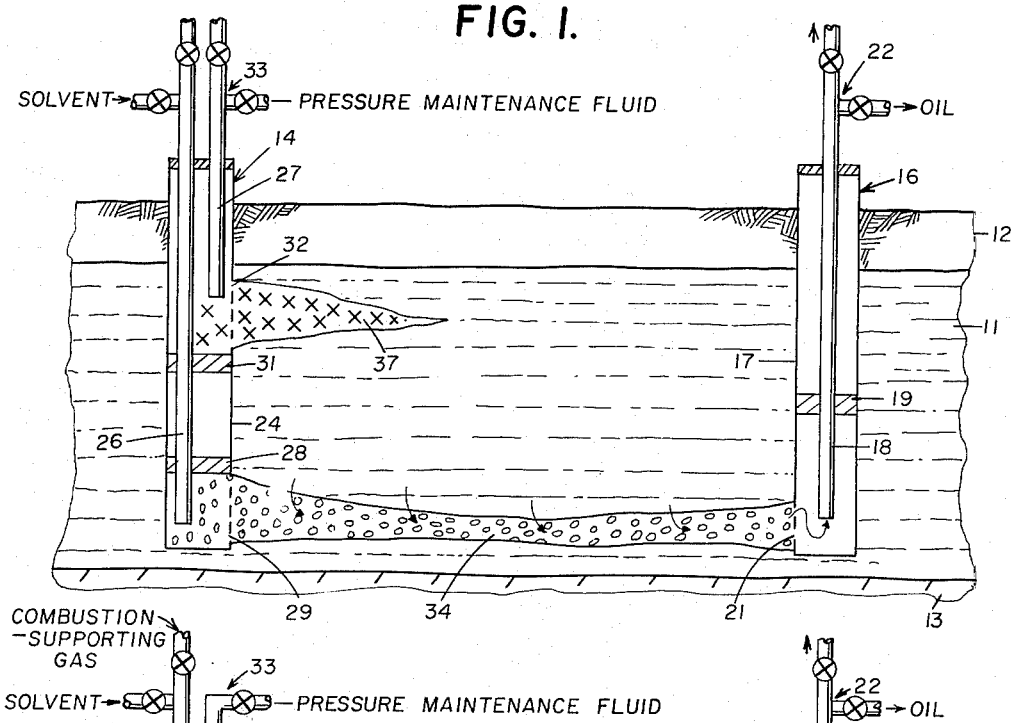
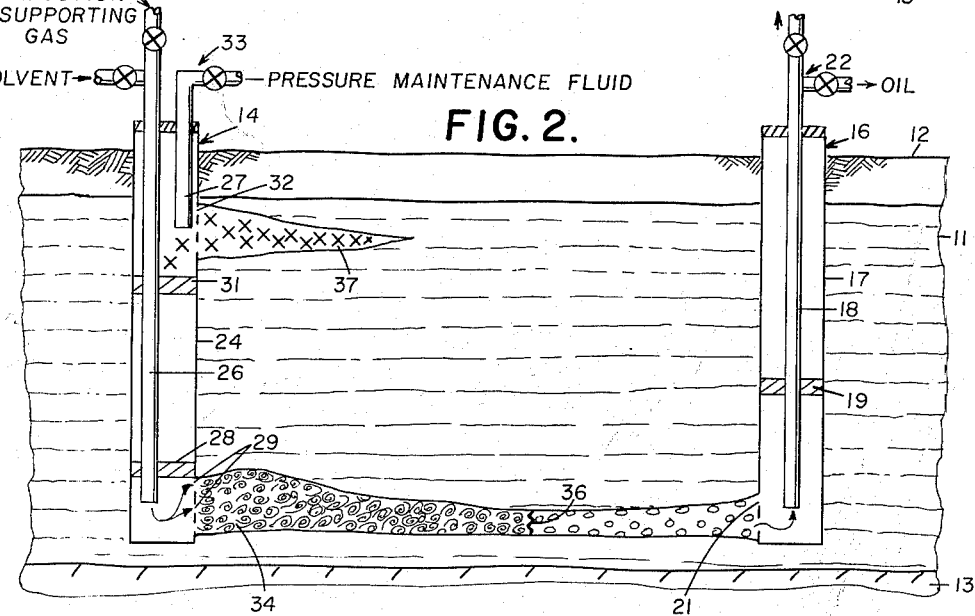
LORLD G. SHARP
INVENTOR.
BY Emil J. Bednar
ATTORNEY.

3,167,121
METHOD FOR PRODUCING HIGH VISCOSITY OIL
Lorld G. Sharp, Irving, Tex., assignor to Socony Mobil Oil Company, Inc., a corporation of New York
Filed Dec. 13, 1962, Ser. No. 244,389
7 Claims. (Cl. 166—11)

This invention relates to a process for producing a viscous crude oil from subterranean formations which otherwise is not recoverable by known primary oil recovery processes. More particularly, it relates to an improved primary recovery process for producing the viscous oil by enhancing the existent natural formation forces, and increasing their level, sufficiently to provide the desired recovery of the oil from the formation.

In each oil-containing formation there are one or more natural forces in existence for producing the oil from the formation. Among these forces are gravity, natural pressure drives of fluids, such as water and gas caps, and solution gas drives. Where the oil is of low viscosity it may be readily produced into a vertical well by these natural forces. However, where the viscosity of the oil is high, appreciable amounts of the oil will not flow horizontally through the formation to a vertical well even though it is capable of vertical gravitation. Thus, primary oil recovery of such viscous oil is very limited. Examination of this problem indicates that under such circumstances the powerful natural forces which exist for producing the oil are balanced by the forces created by capillarity. Capillarity is the inner action between the molecules of the oil and those of the formation providing a restraining force on the production of oil. The capillarity is believed to exist as the result of two basic formation characteristics preventing the desired production of a viscous oil. The first characteristic is the openings or channels through which the oil must flow in the formation to reach the production well. The second characteristic is the pore spaces of the formation which are storage containers for fluids. Thus, the flow channels provide for the storage of oil and also for the continuity of oil flows through the formation, whereas the pore spaces provide solely for storage of the oil. When the oil is sufficiently viscous, the natural formation forces for producing the oil are insufficient to overcome the resistance to oil flow by the formation openings or channels and to overcome the effect of "porostriction" which restrains the oil from leaving the formation's pore spaces. The term "porostriction" may be conveniently defined as a measure of the flow resistance between areas of storage and the flow channels, or pores.

There are secondary oil recovery processes for producing viscous oil from formations where the natural forces are insufficient to move the oil through such formations into vertical production wells. In these processes, great external forces are supplied to the formation to drive the viscous oil from the formation into production wells. These forces may be, for example, miscible solvent drives. Because these processes rely upon applying great external forces rather than upon the powerful natural existing forces, they are termed secondary recovery processes. Such processes are comparatively expensive and find commercial use only under exceptional circumstances. The present invention is directed to an improved primary recovery process for producing viscous crude oil from formations by applying only small magnitudes of external forces to unleash or enhance the existent powerful natural formation forces for producing oil and overcoming the restraint to production resulting from the characteristics of the formation.

It is therefore an object of the present invention to provide an improved primary recovery process for producing viscous crude oil from subterranean oil-containing formations by utilizing the powerful natural formation forces to a degree sufficient to produce the oil into a vertical production well. Another object of the present invention is to provide such a process which uses only small amounts of external forces for enhancing the powerful natural formation forces available for producing viscous oils to a degree sufficient to overcome the production restraining characteristics of the formation. Another object of the present invention is to provide an improved primary recovery process adapted to be practiced with conventional producing equipment in conventional wells penetrating the oil-containing formation and with inexpensive small external forces.

These and other objects will become apparent when read in conjunction with the following detailed description, the appended claims, and the attached drawing of certain preferred and illustrative embodiments of the invention, wherein:

FIGURE 1 is a vertical section of the earth showing an oil-containing formation penetrated by wells after certain steps of this invention have been carried out; and FIGURE 2 is the same view as FIGURE 1 but showing the formation after the remaining steps of the present invention have been carried out.

In accordance with this invention there is provided a process for producing viscous oil by applying comparatively small external forces to the formation for enhancing the existent natural formation forces at their initial level until the rate of oil recovery is reduced below a desired value; and then, increasing the effective level of the natural formation forces, in increments, by applying modest external forces to the formation so as to produce oil at a desired rate of recovery, and repeating the prior steps until an increased level of these forces is obtained which produces the desired recovery of the viscous oil.

Referring now to FIGURES 1 and 2 of the drawing, there is shown a viscous oil-containing formation 11 interpositioned between a layer of overburden 12 and substrata 13. The oil is sufficiently viscous that it cannot flow horizontally through the formation 11 and therefore be recovered in commercial amounts by known recovery processes. For example, under formation conditions, such an oil may have a viscosity of 600 centipoises. However, this oil can move vertically short distances toward areas of reduced pressure responsively to the natural formation forces. The formation 11 is penetrated by an injection well 14 and a production well 16 in horizontally spaced relationship as the initial process step if such wells are not already in existence.

The production well 16 contains a casing 17 cemented to the formation 11. A production tubing 18 is positioned in the casing 17 and extends to the lower portion of the well 16. The tubing 18 is sealed to the casing 17 by a packer 19. A plurality of perforations 21 are provided in the cemented casing 17 below packer 19 to provide fluid communication between the formation 11 and the tubing 18. The tubing 18 may be connected to conventional wellhead apparatus 22, including pumps (not shown) for removing oil at reduced pressure from the well 16.

The injection well 14 is provided with a casing 24 cemented to the formation 11 in a conventional manner and contains a plurality of tubings 26 and 27 for injecting fluids into the casing 24. A first tubing 26 extends to the lowermost portion of the well 14 and is sealed to the casing 24 by packer 28 and thereby isolates the lowermost section of the well 14. This isolated section is placed in fluid communication with the formation 11 by perforations 29 through the cemented casing 24. A second injection tubing 27 extends into upper portion of the well 14 and tubing 26 is sealed to the casing 24 by packer 31 to isolate a second section in the well 14. This second isolated section is placed in fluid communication with the formation 11 by perforations 32 through the cemented casing 24 above the packer 31. Suitable means at the wellhead 33 for injecting fluids through the first and second injecting tubings 26 and 27 may be provided and, in general, will include pumps (not shown) for pressuring such fluids into the formation 11.

(A) *Steps for enhancing the natural formation forces, at their initial level, sufficiently to produce the viscous oil*

A horizontally disposed communication zone 34 is formed between the injection well 14 and the production well 16 at a relatively thin horizon in the formation 11. This horizon is selected at that horizontal portion of the formation to which the viscous oil will be moved most effectively by the natural formation forces when the pressure in the communication zone 34 is less than the pressure in the remainder of the formation 11. In accordance with this invention, the communication zone 34 is formed by creating a more permeable channel providing for greater hydrocarbon mobility with a small vertical and preferably large horizontal dimensions which is continuous from well to well. The channel may be formed by hydraulic fracturing or by other means such as driving a slug of solvent therethrough with a pressured gas. However, most conveniently, injecting a batch of liquid hydrocarbon solvent into formation 11 through the tubing 26 in the injection well 14 under suitable pressure and in sufficient amount to move the solvent through the formation 11 until it breaks through or appears at the production well 16 will form the communication zone 34. The solvent is used in small quantities as it need not be circulated between wells but merely fills the communication zone 34, whether used to form the communication zone 34 or merely to fill the zone if it is formed by other means. The solvent, as it fills the communication zone 34, will displace most of the viscous oil from communication zone 34 into the production well 16. As a result, this step increases the hydrocarbon permeability of the communication zone 34 by producing the viscous oil which has "plugged" this portion of the formation's pores and channels. This step permits the ready flow of fluid through the communication zone 34 which reduces the pressure therein relative to that of the formation 11. The communication zone 34 may be compared to a flattened perforated pipe or cased well running substantially horizontally with respect to both its longitudinal and major elliptical axes through a portion of the formation 11 between the injection and production wells 14 and 16, respectively. A suitable liquid hydrocarbon solvent may be chosen from the group which has a high solvent or viscosity reduction power for the viscous oil in the formation. More particularly, a solvent is chosen which has a low viscosity relative to the viscosity of the crude oil. This characteristic of the solvent is desirable to provide the maximum reduction in viscosity of the viscous crude in a mixture formed with a minimum amount of the solvent. Also, the solvent should remain in the liquid phase under typical formation conditions. Generally, a solvent from the group consisting of L.P.G., i.e., light petroleum gases in the liquid phase, such as propane, butane, and mixtures thereof, lightweight crude oils, refinery products derived from processing crude oil such as light and heavy naphtha, kerosene, and similar distillate cuts and mixtures thereof, all having viscosities of about 1 centipoise, will be satisfactory.

The communication zone 34 formed between wells 14 and 16 is of great advantage in this process in that the highly viscous oil need only flow a short vertical distance through the formation 11 to a place of lower pressure and higher hydrocarbon permeability. This flow is obtained responsively to the natural formation forces which include gravity. Also, the viscosity of the oil is greatly decreased through the oil mixing with the solvent in the communication zone 34 to greatly increase its fluidity or mobility for flowing to the production well 16 for recovery. Thus, the viscous oil does not retain its highly viscous properties during movement through the formation 11 to the production well 16. This is an advantage when compared to conventional primary or secondary recovery processes which must move all of the oil in its original viscous form substantially horizontally through the formation 11 into the production well 16 by application of great external forces. The solvent may be separated from the viscous oil at the wellhead 22 and recycled, if desired.

As there is an increase in the amount of crude oil dissolved in the solvent during oil production, the viscosity of the resulting mixture slowly increases. However, large amounts of the viscous crude oil can be dissolved in compartively small quantities of solvent with the resultant mixture remaining highly mobile and readily flowing through the communication zone 34. This result is created by using a solvent having a high viscosity reducing power provided by its viscosity of about 1 centipoise to exert viscosity-reducing effects in a mixture with the viscous oil which are greater proportionately than the respective volumetric quantities of the components of the mixture.

To enhance the movement of the solvent and crude oil mixture through the communication zone 34, a step of reducing the pressure in the production well 16 may be practiced. The pressure in the production well 16 is reduced in magnitude as feasible by available wellhead equipment 22. However, the pressure should not be reduced to a degree where the solvent vaporizes in the communication zone 34. Thus, a pressure differential is created across the communication zone 34 between the formation 11 and the production well 16 to cause even greater amount of the viscous oil to flow from the formation 11 into the communication zone 34 and thence into the production well 16.

There eventually is a decrease in one of the natural formation forces, i.e., the formation pressure, which produces the viscous oil as the oil flows from the formation 11 into the production well 16. Decrease in the formation pressure may be reduced by pressuring a compressible fluid into the formation 11 via the second injection tube 27. The amount of such fluid pressured into the formation 11 should be such at least to maintain the formation pressure. Suitable fluids may be natural gas, flue gases, and other similar fluids used in conventional pressure maintenance processes. Injecting small quantities of natural gas is sufficient to compensate for the pressure reduction created by production of large amounts of viscous oil. Thus, this step is adapted to maintain the reservoir pressure at its initial level to preserve the natural formation pressure. In addition, this step assists in preventing the influx of water or other undesirable fluids into the formation 11 which otherwise might prevent recovery of the available oil in the formation.

The oil displaced by the natural formation forces into the production well 16 via the communication zone 34 is produced until the rate of oil production decreases below a desired rate. The decreased rate is a result of great quantities of the viscous oil intermixing with the solvent until there eventually is formed a mixture which by its immobility causes "plugging" of the communication zone. Generally, the desired rate is the amount of oil per unit interval which needs to be produced for commercial operation of the wells.

Under these "plugging" conditions, the natural forces in the formation 11 remain sufficiently powerful to produce even greater quantities of oil if the conditions which enhance them are restored. The enhancement of the natural formation forces at their initial level, is restored by injecting a fresh batch of the solvent through the tubing 26 in the injection well 14 until the fresh solvent enters the production well 16. The same considerations as to the solvent, its characteristics, and amounts are equally applicable here as in the priorly described solvent-injecting step. Thus, the communication zone 34 is restored to its original highly permeable character by clearing the "plugging" solvent and viscous oil mixture. Thus, the viscous oil again will flow into the communication zone 34 and thence to the production well 16, as priorly described, until the great amounts of viscous oil entering the solvent in the communication zone 34 will again approach the condition of plugging the zone. By repeating the previously described steps beginning after the step of injecting the initial batch of liquid solvent, the natural formation forces for producing the viscous oil will be repeatedly enhanced at their initial level until these forces are of an insufficient magnitude to produce the viscous oil at the desired rate of recovery.

(B) *Increasing the level of the natural formation forces*

The present invention provides for increasing the effective level of the existent natural formation forces, in increments, after these enhanced forces at their initial level are incapable of producing the desired rate of all production. This result is obtained by steps wherein a very small portion of the viscous oil present in the formation 11 is utilized in applying a modest force to the formation 11. This result is obtained by the following steps. With reference to FIGURE 2, suitable means are applied from the injection well 14 to ignite the hydrocarbons in the communication zone 34 adjacent the injection well 14. Such means may be electric heaters, pyrotechnic devices, or gas burners, and the like. As the hydrocarbon materials in the communication zone 34 are ignited, and thereafter, a combustion-supporting gas is supplied the ignited hydrocarbons by injection through the tubing 26. This is one means for passing an in situ combustion wave 36 from the injection well 14 through the communication zone 34 to the production well 16. The combustion products are recovered through tubing 18. As a result, the communication zone 34 and the remainder of the formation 11 surrounding same is heated sufficiently that the level of the natural formation forces for producing oil is increased by the desired increment. For example, increasing the average temperature of the surrounding formation by 10° increments usually will be sufficient to increase the level of the natural formation forces for continuing production of the viscous oil at a desired rate of recovery. If desired, reverse in situ combustion may be used as is apparent to one skilled in the art. The combustion-supporting gas may be air, oxygen, or mixtures thereof, and, if desired, fuel may be mixed therewith if greater heat production is desired of the combustion wave 36 than is provided by the fuels in the communication zone 34. Thus, a small amount of the viscous oil in the communication zone 34 is consumed to provide an increase in the effective level of the existent natural formation forces for producing greater amounts of the available oil.

The priorly described steps, after the step of injecting the initial batch of liquid solvent into the communication zone 34, are repeated to enhance the natural formation forces at the increased level as described in the second previous paragraph. These steps are utilized to produce all the viscous oil recoverable at the desired rate at this particular increased level. These described steps of this invention are repeated at each incremental increase in level of the natural formation forces until the desired recovery of the viscous oil from the formation 11 is obtained.

As clearly shown in FIGURES 1 and 2, continued production of the viscous oil is possible at each increased level of the natural formation forces. Further, the production of viscous oil is greatly assisted by the increased mobility of the viscous oil passing through the heated communication zone 34. This reduces the "plugging" effects of the viscous oil mixtures and maintains the communication zone 34 at sustained reduced pressures relative to the remainder of the formation 11.

From the foregoing it will be apparent that the process of the present invention is well adapted to utilize the powerful natural formation forces for producing viscous oil from the formation 11 by the application of small external forces. By enhancing the natural formation forces at their initial level, the viscous oil is believed to be primarily produced from the openings or channels in the formation 11 through which the oil must flow to reach the producing well 16. Such forces include gravity, the natural formation pressure which is maintained in the manner described, and any solution gas drive present in the oil. By increasing the effective level of the enhanced natural formation forces it is believed that the viscous oil is increasingly produced from the pore spaces of the formation 11 which are the storage containers for some of the viscous oil. However, whatever the mechanism of the production of the viscous oil from the formation 11, it is obvious by the present invention that the powerful natural formation forces are utilized for the production of the viscous oil by applying to the formation of only small amounts of external forces for enhancing them. Also, only a small portion of the viscous oil is consumed in this process so that substantially all the oil entering the communication zone 34 can be recovered.

It will be apparent from the foregoing description that herein is fully described a novel process well adapted to obtain the maximum recovery of viscous oil from a subterranean formation as a mode of primary oil recovery. Further, only a small portion of such viscous oil is dissipated in practicing this invention along with small quantities of other external forces.

As many embodiments as possible may be made of the invention without departing from the scope thereof, and these are contemplated by and within the scope of the claims. It is to be understood that all matter herein set forth as shown in the accompanying drawing is to be interpreted as illustrative and not in a limiting sense.

What is claimed is:

1. A process for producing viscous crude oil from a subterranean oil-containing formation by enhancing the natural formation forces sufficiently to produce the oil into a producing well comprising the steps of:
   (a) providing an injection well and a production well in horizontally spaced relationship penetrating the oil-containing formation;
   (b) treating the formation to create a communication zone of higher permeability than the remainder of the formation between the injection and production wells;
   (c) injecting a batch of a liquid solvent through the injection well into the communication zone until the solvent breaks through at the production well;
   (d) producing oil from the formation through the communication zone and into the production well until the oil production rate decreases below a desired rate as a result of viscous oil plugging the communication zone;
   (e) injecting a fresh batch of the solvent into the communication zone until fresh solvent breaks through at the production well and repeating steps (d) and (e) until the natural formation forces at their initial level are insufficient in magnitude to produce the viscous oil into the production well at a desired rate of recovery;
   (f) igniting the hydrocarbons in the communication zone adjacent to the injection well;
   (g) passing an in situ combustion wave through the communication zone by supplying a combustion supporting gas to the ignited hydrocarbons to heat the surrounding formation whereby the level of the natural formation forces for producing oil is increased;

(h) producing the viscous oil from the formation through the heated communication zone into the production well at the increased level by repeating the preceding steps (d) and (e); and (i) repeating the steps (f) through (h) until an increased level of natureal formation forces for producing oil is obtained which produces the desired recovery of the viscous oil from the formation.

2. A process for producing viscous crude oil from a subterranean formation by enhancing the natural formation forces sufficiently to produce the oil into a producing well comprising the steps of:

(a) providing an injection well and a production well in horizontally spaced relationship penetrating the oil-containing formation and each well in communication with a portion of the formation through which the viscous oil will be moved by the natural formation forces responsively to a reduction in pressure in such portion of the formation;

(b) treating the formation to create a substantially horizontal communication zone of higher permeability than the remainder of the formation through the mentioned portion of the formation;

(c) injecting a liquid solvent through the injection well into the communication zone until the solvent breaks through at the production well and said solvent being selected from the group consisting of L.P.G., lightweight crude oils, refinery products derived from processing crude oil, and mixtures thereof, wherein all members of such group have a viscosity of about 1 centipoise;

(d) pressuring natural gas through the injection well into the formation at a location remote from the production well in an amount to maintain the formation pressure;

(e) creating a pressure in said production well of a magnitude less than the formation pressure to move the hydrocarbons from the communication zone into the production well and in excess of the pressure required to maintain the solvent in a liquid phase in the communication zone;

(f) producing oil from the formation through the communication zone and into the production well until the oil production rate decreases below a desired rate of recovery as a result of viscous oil substantially plugging the communication zone;

(g) injecting a fresh batch of the liquid solvent into the communiaction zone until the fresh solvent enters the production well and repeating steps (d) through (g) until the natural formation forces at their initial level are insufficient in magnitude to produce the viscous oil into the production well at a desired rate of recovery;

(h) igniting the hydrocarbons in the communication zone adjacent to the injection well;

(i) supplying a combustion-supporting gas to the ignited hydrocarbons to pass an in situ combustion wave through the communication zone from the injection well to the production well to heat the surrounding formation whereby the level of the natural formation forces for producing oil is increased;

(j) producing the viscous oil from the formation through the heated communication zone into the production well at the increased level by repeating the preceding steps (d) through (g); and (k) repeating the steps (h) through (j) until an increased level of the natural formation forces for producing oil is obtained which produces the desired recovery of the viscous oil from the formation.

3. In a primary recovery process for producing viscous crude oil from a subterranean formation penetrated by a pair of spaced-apart wells comprising the steps of:

(a) enhancing the natural formation forces for producing oil at their initial level sufficiently to produce oil by (1) treating the formation to create a horizontal portion of the formation between wells of greater permeability than the remainder of the formation, (2) injecting a liquid solvent through the horizontal portion of greater permeability until the solvent is continuous from well to well, (3) producing oil from the formation through the horizontal portion of the formation and into a first well of said pair of wells until the rate of oil recovery decreases below a desired rate, (4) clearing the viscous oil from the horizontal portion by repeating step (2) and producing oil by step (3) until the natural formation forces at their initial level are insufficient in magnitude to produce the viscous oil at a desired rate of recovery; and (b) increasing the level of the natural formation forces by (1) igniting the hydrocarbons in the horizontal portion of the formation and supplying a combustion-supporting gas to the ignited hydrocarbons to pass an in situ combustion wave between wells through the horizontal portion of the formation so as to heat the surrounding formation whereby the level of the natural formation forces for producing oil is increased, and (2) producing the viscous oil at the increased level from the formation through the heated horizontal portion of the formation and into the first well by repeating the steps (2), (3), and (4) for enhancing the natural formation forces for producing oil, and repeating the steps (1) and (2) for increasing the level of the natural formation forces for producing oil until an increased level of such forces is obtained which produces the desired recovery of the viscous oil from the formation.

4. The process of claim 3 including the step of pressuring natural gas through the second well of said pair of wells into the formation at a location remote from the first well to maintain formation pressure.

5. The process of claim 3 including the step of reducing the pressure in the first well below the formation pressure to move the hydrocarbons from the horizontal portion of the formation into such oil-producing well and the pressure being greater than the pressure required to vaporize the solvent in such horizontal portion of the formation.

6. In a primary recovery process for producing viscous crude oil from a subterranean formation penetrated by a pair of spaced-apart wells comprising the steps of:

(a) enhancing the natural formation forces for producing oil at their initial level sufficiently to produce oil by (1) injecting a batch of liquid hydrocarbon solvent horizontally from a first well through a portion of the formation to the second well to create a production channel of higher permeability than the remainder of the formation and filled with such solvent, (2) injecting natural gas from the first well into the formation at a location remote from the second well and reducing the pressure in the second well below the formation pressure and in excess of the pressure required to vaporize the solvent in the production channel, (3) producing oil from the formation through the production channel and into the second well until the rate of oil recovery decreases below a desired rate, and (4) clearing the viscous oil from the production channel by injecting another batch of the liquid hydrocarbon solvent therethrough until the solvent appears at the second well and repeating steps (2), (3), and (4) until the natural forces at their initial level are insufficient in magnitude to produce the viscous oil at a desired rate of recovery; and (b) increasing the level of the natural formation forces by (1) igniting the hydrocarbons in the production channel and supplying a combustion-supporting gas to the ignited hydrocarbons to pass an in situ combustion wave through the production channel between wells whereby the level of the natural formation forces is increased, and (2) producing the viscous oil at the increased level from the formation through the heated production channel and into the second well by repeating the steps (2), (3), and (4) for enhancing the natural formation forces for producing oil, and repeating the steps (1) and (2) for increasing the level of the natural formation forces for producing oil until an increased level of such forces is obtained which produces the desired recovery of viscous oil.

7. The process of claim 6 wherein the solvent is selected from the group consisting of L.P.G., lightweight crude oils, refinery products derived from processing crude oil, and mixtures theerof, wherein all members of such group have a viscosity of about 1 centipoise.

References Cited in the file of this patent
UNITED STATES PATENTS

| | | |
|---|---|---|
| 2,910,123 | Elkins et al. | Oct. 27, 1959 |
| 2,924,276 | Heilman et al. | Feb. 9, 1960 |
| 2,994,373 | Stone | Aug. 1, 1961 |
| 3,004,594 | Crawford | Oct. 17, 1961 |